United States Patent
Bishop et al.

(10) Patent No.: US 6,758,041 B2
(45) Date of Patent: Jul. 6, 2004

(54) ELECTRIC POWER BRAKE BOOSTER

(75) Inventors: Todd A. Bishop, Centerville, OH (US); William C. Kruckemeyer, Beavercreek, OH (US); David J. Barta, Beavercreek, OH (US)

(73) Assignee: Delphi Technologies, Inc., Troy, MI (US)

(*) Notice: Subject to any disclaimer, the term of this patent is extended or adjusted under 35 U.S.C. 154(b) by 77 days.

(21) Appl. No.: 10/242,200

(22) Filed: Sep. 12, 2002

(65) Prior Publication Data

US 2004/0050045 A1 Mar. 18, 2004

(51) Int. Cl.[7] .................................................. F15B 7/00
(52) U.S. Cl. ...................................................... 60/545
(58) Field of Search .......................... 60/545, 538, 541

(56) References Cited

U.S. PATENT DOCUMENTS 4,395,883 A * 8/1983 Melinat ........................ 60/545
5,094,079 A * 3/1992 Leigh-Monstevens et al. ........ 60/545
6,574,959 B2 * 6/2003 Fulks et al. ................... 60/545

* cited by examiner

Primary Examiner—Thomas E. Lazo
(74) Attorney, Agent, or Firm—Michael D. Smith

(57) ABSTRACT

A brake apparatus and method utilize an electric power brake booster for operating a push rod actuated hydraulic master cylinder. The existing vehicle electrical system provides electric power for the power brake booster, thus eliminating the need for engine driven or auxiliary pressure/vacuum sources. The electric power brake booster includes an electrically powered actuator having an output shaft adapted for operative connection to the master cylinder, and an input for receipt of a signal indicative of force applied to the push rod. The electrically powered actuator augments the force applied to the push rod in response to the signal indicative of the force applied to the push rod. The booster may include a sensor for sensing force applied to the push rod and generating the signal indicative of the force applied to the push rod.

24 Claims, 1 Drawing Sheet

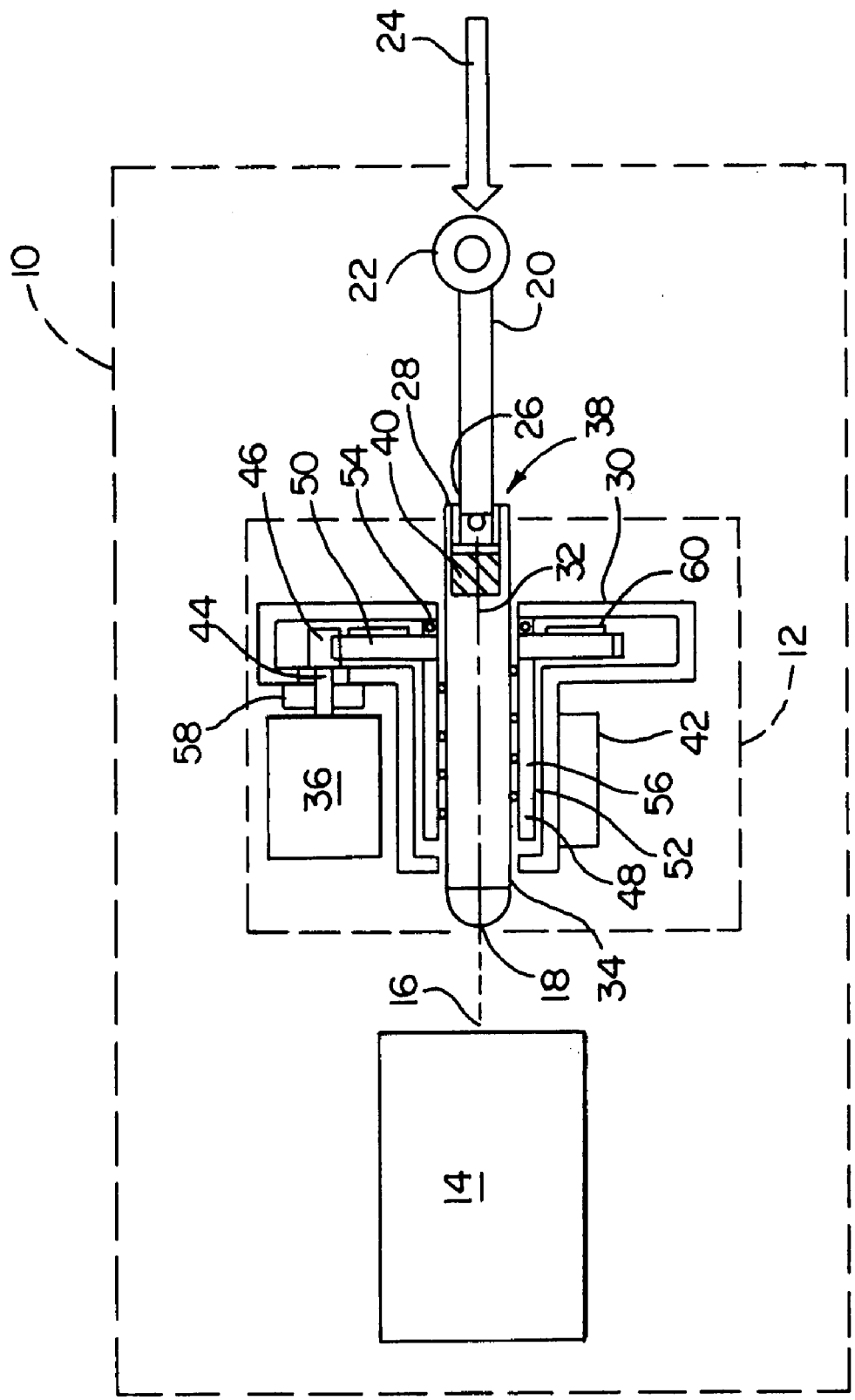

ELECTRIC POWER BRAKE BOOSTER

TECHNICAL FIELD OF THE INVENTION

This invention relates to vehicle brake systems, and more particularly to an apparatus and method for electrically augmenting the force applied through a push rod to a push rod actuated hydraulic master cylinder in a vehicle brake system.

BACKGROUND OF THE INVENTION

Hydraulic brake systems for vehicles such as automobiles, trucks, buses, and motor homes, typically include a push rod actuated master cylinder for generating a hydraulic pressure that is transmitted through brake lines to actuate hydraulic brakes attached to the wheels of the vehicle, for slowing or stopping the wheels. It is desirable in such hydraulic brake systems for vehicles to include a power brake booster for augmenting the force applied to a brake pedal connected to the push rod, so that the amount of force that the operator is required to apply to the pedal for stopping or slowing the vehicle is significantly reduced.

Such power brake boosters have, in the past, typically utilized engine vacuum, hydraulic pressure, or pneumatic pressure to drive one or more pistons connected to the master cylinder for augmenting the force applied to the master cylinder via the push rod when the operator is pushing on the brake pedal. The engine vacuum is created by the action of a throttle mechanism, located inside the engine, that is used to cause vaporization and mixing of the fuel with combustion air. An alternate vacuum source in the form of an engine driven or electric vacuum pump may also be utilized. Pressure actuated power brake boosters require a source of pressure such as the power steering pump or a hydraulic boost pump for hydraulic systems or an air compressor for pneumatic systems.

Some modern vehicles are "throttle-less," however, and have no engine vacuum available for use in operating a power brake booster. In one form of such a vehicle, the vaporization and mixing of the fuel with combustion air is accomplished by judiciously regulating injection of the fuel through fuel injectors, and controlling the intake of combustion air by regulating the movement of engine intake valves.

In addition, the advent of "steer by wire" technology will eliminate the power steering pump as an available source of hydraulic power to operate a brake booster. The implementation of these technologies into future motor vehicles will require the addition of an electric or engine driven pump to provide a power source for the brake assist function.

What is needed, therefore, is an improved power brake booster that does not require engine vacuum or an auxiliary pressure or vacuum source to augment the force applied to the master cylinder via the push rod from the brake pedal.

SUMMARY OF THE INVENTION

Our invention provides a brake apparatus having an electric power brake booster, which does not require engine vacuum, for a push rod actuated hydraulic master cylinder.

In one form of our invention, the electric power brake booster includes an electrically powered actuator having an output shaft adapted for operative connection to the master cylinder, and an input for receipt of a signal indicative of force applied to the push rod. The electrically powered actuator augments the force applied to the push rod in response to the signal indicative of the force applied to the push rod. The booster may include a sensor for sensing force applied to the push rod and generating the signal indicative of the force applied to the push rod.

The electric booster may include a booster shaft supported within a housing for reciprocating movement along an axis. The booster shaft has an input end adapted for receiving an output end of the push rod and an output end adapted for operative connection to the master cylinder. The booster may also include an electric motor having an output shaft for delivering a torque, and a drive element including a ball screw operatively connected between the output shaft of the electric motor and the booster shaft for converting torque from the motor into axial force applied to the booster shaft. The booster may further include a motor brake operatively connected to the motor shaft for applying braking force to the motor shaft.

Our invention may also take the form of a method for operating a push rod actuated master cylinder, by connecting an electric brake booster to the master cylinder for augmenting a force applied to the push rod.

The foregoing and other features and advantages of our invention are apparent from the following detailed description of exemplary embodiments, read in conjunction with the accompanying drawing. The detailed description and drawing are merely illustrative of the invention rather than limiting, the scope of the invention being defined by the appended claims and equivalents thereof.

BRIEF DESCRIPTION OF THE DRAWING

The drawing is a schematic representation of an exemplary embodiment of a brake apparatus, according to our invention, having an electric power brake booster.

DETAILED DESCRIPTION OF THE PRESENTLY PREFERRED EMBODIMENT

The drawing illustrates an exemplary embodiment of a brake apparatus 10, according to our invention. The brake apparatus 10 includes an electric brake booster 12, a push rod actuated hydraulic master cylinder 14 having an input 16 operatively connected to an output 18 of the electric brake booster 12, and a push rod 20 having an input end 22 thereof for receipt of a push rod force, as illustrated by arrow 24, from a brake pedal. The output end 26 of the push rod 20 is operatively connected to an input 28 of the electric brake booster 12.

The electric brake booster 12 includes an electrically operated actuator having a housing 30, adapted for connection to the master cylinder 14, and defining an axis of motion 32. A booster shaft 34 is disposed within the housing 30 for reciprocating movement along the axis 32. The booster shaft 34 has an input end 28 adapted for receiving the output end 26 of the push rod 20 and an output end 18 adapted for operative connection to the master cylinder 14.

The electrically operated actuator further includes an electrical device, in the form of an electric motor 36 operatively connected, as described in more detail below, for applying an axial force to the booster shaft 34 to cause the booster shaft 34 to move along the axis 32.

The input end 28 of the booster shaft 34 includes a push rod receptacle 38, adapted to receive the output end 26 of the push rod 20. A sensor 40 is located in the push rod receptacle 38, between the push rod 20 and the booster shaft 34, for sensing the force 24 applied to the push rod 20. Many types of sensors, including piezoelectric and magneto-restrictive sensors, can be used in practicing our invention.

The sensor 40 is operatively connected to the electric motor 36, via a controller 42, for delivering a control signal to the electric motor 36. The sensor 40 generates a signal indicative of the force 24 being applied to push rod 20. The controller 42 receives the signal indicative of push rod force 24 from the sensor 40, and generates a control signal that is transmitted to the electric motor 36 for controlling the axial force applied by the electric motor 36 to the booster shaft 34, and thereby the amount of augmentation by the electric booster 12 of the push rod force.

The controller 42 is configured to control the degree to which the electric booster 12 will augment the push rod force 24 as a function of the push rod force 24. The controller 42 may also be configured to include a wide variety of control methodologies, such as proportional, integral, and differential control.

The operative connection between the motor 36 and the booster shaft 34 may include many different types of drive elements. In the exemplary embodiment shown in the drawing, the electric motor 36 includes an output shaft 44 for delivering a torque, in response to the control signal, through a drive pinion 46. A ball screw 48 assembly is operatively connected, by the pinion 46 and a ball screw drive gear 50, between the output shaft 44 of the electric motor 36 and the booster shaft 34 for converting torque from the motor 36 into axial force applied to the booster shaft 34. The ball screw 48 is supported within the housing 30 by a support bearing 52. A thrust bearing 54 is provided for transmitting axial forces on the rotating nut portion 56 of the ball screw 48 into the housing 30.

The exemplary booster 12 also includes a motor brake 58, operatively connected to the motor shaft 44, for applying braking force to the motor shaft 44. The motor brake 58 may be utilized for locking the motor shaft 44 in position during extended braking periods, so that it is not necessary to continually apply the control signal to the motor 36 to have the brake apparatus 10 maintain a desired force on the master cylinder input 14.

When the push rod force 24 is removed or reduced, by the operator releasing or reducing force applied to the brake pedal, hydraulic pressure in the brake system will be released and fluid in the brake system will flow back into the master cylinder 14. As the master cylinder 14 receives this fluid, it will push the booster shaft 34 back along the axis 32. To increase the speed at which the booster shaft 34 retracts along the axis, and to ensure that the booster shaft 34 moves to a fully retracted position, the booster 12 includes a retraction spring 60.

The retraction spring 60 in the exemplary embodiment is in the form of a torsion or wrapped spring operatively connected between the ball screw drive gear 50 and the housing 30, in such a manner that as the ball screw drive gear 50 rotates in a first direction about the axis 32 for moving the booster shaft 34 toward the master cylinder 14, torque is built up in the retraction spring. When the push rod force 24 is removed or reduced, with the motor brake 58 disengaged, the release of hydraulic pressure in the brake system will drive the push rod shaft 34 along the axis 32 in a direction away from the master cylinder 14. As the push rod shaft 34 moves along the axis in away from the master cylinder 14, the nut portion 56 of the ball screw 48 and the ball screw drive gear 50 rotate in an opposite direction about the axis 32, with the torque built up in the retraction spring 60 during application of the brakes being released to help drive the ball screw drive gear and nut portion 50, 56 in the opposite direction about the axis 32.

While the embodiments of our invention disclosed herein are presently considered to be preferred, various changes and modifications can be made without departing from the spirit and scope of the invention. The various elements and aspects of our invention may also be used independently from one another, or in different combinations than are described above and in the drawing with regard to the exemplary embodiment.

The scope of the invention is indicated in the appended claims. We intend that all changes or modifications within the meaning and range of equivalents are embraced by the claims.

We claim:

1. An electric power brake booster for a push rod actuated hydraulic master cylinder, the brake booster comprising:
    an electrically powered actuator having an output shaft adapted for operative connection to the master cylinder, and an input for receipt of a signal indicative of force applied to the push rod,
    the electrically powered actuator augmenting the force applied to the push rod in response to the signal indicative of the force applied to the push rod;
    the electrically powered actuator further comprising a brake operatively connected for locking the output shaft of the electrically powered actuator in a desired position.

2. The booster of claim 1 further comprising a sensor for sensing force applied to the push rod and generating the signal indicative of the force applied to the push rod.

3. The booster of claim 1 wherein the electrically operated actuator further comprises:
    a housing adapted for connection to the master cylinder and defining an axis; and
    a booster shaft disposed within the housing for reciprocating movement along the axis, the booster having an input end adapted for receiving an output end of the push rod and an output end adapted for operative connection to the master cylinder.

4. The booster of claim 3 wherein the input end of the booster shaft includes a receptacle for receiving the output end of the push rod, and the booster shaft further comprises a sensor disposed in the receptacle for sensing force applied to the push rod and generating the signal indicative of the force applied to the push rod.

5. The booster of claim 3 wherein the electrically operated actuator further comprises an electrical device operatively connected for applying an axial force to the booster shaft.

6. The booster of claim 5 further comprising a sensor for sensing the force applied to the push rod, wherein the sensor is operatively connected to the electrical device for delivering a control signal to the electrical device for controlling the axial force applied by the electrical device to the booster shaft.

7. The booster of claim 6 further comprising a controller for receiving a signal from the sensor and generating the control signal.

8. The booster of claim 5 wherein the electrically operated actuator further comprises a drive element operatively connected between the electrical device and the booster shaft for receiving a force from the electrical device applying an axial force to the booster shaft.

9. The booster of claim 8 wherein:
    the electrical device includes an electric motor having an output shaft for delivering a torque; and
    the drive element includes a ball screw operatively connected between the output shaft of the electric motor and the booster shaft for convening torque from the motor into axial force applied to the booster shaft.

10. An electric power brake booster for a push rod actuated hydraulic master cylinder, the brake booster comprising:

an electrically powered actuator having an output shaft adapted for operative connection to the master cylinder, and an input for receipt of a signal indicative of force applied to the push rod;

the electrically powered actuator augmenting the force applied to the push rod in response to the signal indicative of the force applied to the push rod;

a sensor for sensing force applied to the push rod and generating the signal indicative of the force applied to the push rod;

the electrically operated actuator further comprising a housing adapted for connection to the master cylinder and defining an axis, and a booster shaft disposed within the housing for reciprocating movement along the axis;

the booster shaft having an input end adapted for receiving an output end of the push rod and an output end adapted for operative connection to the master cylinder;

the input end of the booster shaft including receptacle for receiving the output end of the push rod;

the booster shaft further comprising a sensor disposed in the receptacle for sensing force applied to the push rod and generating the signal indicative of the force applied to the push rod;

the electrically operated actuator further comprising an electrical device operatively connected for applying an axial force to the booster shaft, and a drive element operatively connected between the electrical device and the booster shaft for receiving a force from the electrical device applying an axial force to the booster shaft;

the electrical device including an electric motor having an output shaft for delivering a torque;

the drive element including a ball screw operatively connected between the output shaft of the electric motor and the booster shaft for converting torque from the motor into axial force applied to the booster shaft; and a motor brake operatively connected to the motor shaft for applying braking force to the motor shaft.

11. An electric power brake booster for a push rod actuated hydraulic master cylinder, the brake booster comprising:

an electrical powered actuator having an output shaft adapted for operative connection to the master cylinder, and an input for receipt of a signal indicative of force applied to the push rod;

the electrically powered actuator augmenting the force applied to the push rod in response to the signal indicative of the force applied to the push rod;

a sensor for sensing force applied to the push rod and generating the signal indicative of the force applied to the push rod;

the electrically operated actuator further comprising a housing adapted for connection to the master cylinder and defining an axis, and a booster shaft disposed within the housing for reciprocating movement along the axis;

the booster shaft having an input end adapted for receiving an output end of the push rod and an output end adapted for operative connection to the master cylinder;

the input end of the booster shaft including a receptacle for receiving the output end of the push rod;

the booster shaft further comprising a sensor disposed in the receptacle for sensing force applied to the push rod and generating the signal indicative of the force applied to the push rod;

the electrically operated actuator further comprising an electrical device operatively connected for applying an axial force to the booster shaft, and a drive element operatively connected between the electrical device and the booster shaft for receiving a force from the electrical device applying an axial force to the booster shaft;

the electrical device including an electric motor having an output shaft for delivering a torque;

the drive element including a ball screw operatively connected between the output shaft of the electric motor and the booster shaft for converting torque from the motor into axial force applied to the booster shaft; and a retraction spring operatively connected within the housing for applying a retraction force to the booster shaft.

12. A brake apparatus comprising:

a push rod actuated hydraulic master cylinder for generating a hydraulic pressure in response to a push rod force applied to the master cylinder by the push rod; and an electric brake booster operatively connected to the master cylinder for augmenting the force applied to the master cylinder by the push rod and locking the electric brake booster at a selected value of augmentation of the force applied to the push rod.

13. The brake apparatus of claim 12 further comprising a push rod having a first end thereof adapted to receive the push rod force, and a second end thereof operatively connected to the master cylinder for applying the push rod force to the master cylinder.

14. The brake apparatus of claim 12 wherein the electric brake booster further comprises an electrically powered actuator having an output shaft adapted for operative connection to the master cylinder, and an input for receipt of a signal indicative of the push rod force, the electrically powered actuator augmenting the push rod force applied to the master cylinder in response to the push rod force.

15. The brake apparatus of claim 14 further comprising a sensor for sensing a force applied to the push rod and generating a signal indicative of the push rod force.

16. The brake apparatus of claim 15 wherein the electrically operated actuator further comprises:

a housing adapted for connection to the master cylinder and defining an axis; and a booster shaft disposed within the housing for reciprocating movement along the axis, the booster shaft having an input end adapted for receiving an output end of the push rod and an output end adapted for operative connection to the master cylinder.

17. The brake apparatus of claim 16 further comprising:

an electrical device operatively connected to the sensor for applying an axial force to the booster shaft as a function of the signal indicative of push rod force generated by the sensor;

a controller operatively connected to the sensor and the electrical device for receiving the signal indicative of push rod force from the sensor and generating a control signal for controlling the electrical device as a function of the signal indicative of push rod force.

18. The brake apparatus of claim 17 wherein the electrically operated actuator further comprises a drive element operatively connected between the electrical device and the booster shaft for receiving a force from the electrical device applying an axial force to the booster shaft.

19. The brake apparatus of claim 18 wherein:

the electrical device includes an electric motor having an output shaft for delivering a torque; and the drive element includes a ball screw operatively connected between the output shaft of the electric motor and the booster shaft for converting torque from the motor into axial farce applied to the booster shaft.

20. A brake apparatus comprising:

a push rod actuated hydraulic master cylinder for generating a hydraulic pressure in response to a push rod force applied to the master cylinder by the push rod; and an electric brake booster operatively connected to the master cylinder for augmenting the force applied to the master cylinder by the push rod;

an electrically powered actuator having an output shaft adapted for operative connection to the master cylinder, and an input for receipt of a signal indicative of the push rod force, the electrically powered actuator augmenting the push rod force applied to the master cylinder in response to the push rod force;

a sensor for sensing a force applied to the push rod and generating a signal indicative of the push rod force;

the electrically operated actuator further comprising a housing adapted for connection to the master cylinder and defining an axis, and a booster shaft disposed within the housing for reciprocating movement along the axis, the booster shaft having an input end adapted for receiving an output end of the push rod and an output end adapted for operative connection to the master cylinder; and a motor brake operatively connected to the motor shaft for applying braking force to the motor shaft.

21. A method for operating a push rod actuated hydraulic master cylinder, the method comprising connecting an electric brake booster to the master cylinder for augmenting a force applied to the push rod and locking the electric brake booster at a selected value of augmentation of the force applied to the push rod.

22. The method of claim 21 further comprising augmenting the force applied to the push rod as a function of the force applied to the push rod.

23. The boaster of claim 11 wherein the retraction spring is a torsion spring operatively connected between the ball screw and the housing.

24. A method for operating a push rod actuated hydraulic master cylinder, the method comprising:

connecting an electric brake booster to the master cylinder for augmenting a force applied to the push rod;

augmenting the force applied to the push rod as a function of the force applied to the push rod;

sensing a value indicative of the force applied to the push rod and augmenting the force applied to the push rod as a function of the value indicative of the force applied to the push rod; and locking the electric brake booster at a selected value of augmentation of the force applied to the push rod.

* * * * *